(12) United States Patent
Darty

(10) Patent No.: US 6,899,854 B2
(45) Date of Patent: May 31, 2005

(54) IMAGE FORMING APPARATUS UTILIZING NANOTUBES AND METHOD OF FORMING IMAGES UTILIZING NANOTUBES

(75) Inventor: Mark Darty, Collierville, TN (US)

(73) Assignee: Brother International Corporation, Bridgewater, NJ (US)

(*) Notice: Subject to any disclaimer, the term of this patent is extended or adjusted under 35 U.S.C. 154(b) by 471 days.

(21) Appl. No.: 10/101,225

(22) Filed: Mar. 20, 2002

(65) Prior Publication Data
US 2003/0180640 A1 Sep. 25, 2003

(51) Int. Cl.[7] .................................................. B01J 19/08
(52) U.S. Cl. .................. 422/186.04; 204/164; 361/226; 313/309
(58) Field of Search .................... 422/186.04; 204/164; 361/226; 313/309

(56) References Cited

U.S. PATENT DOCUMENTS 6,545,396 B1 * 4/2003 Ohki et al. .................. 313/309
6,760,051 B2 * 7/2004 Fujii et al. ................... 347/141

FOREIGN PATENT DOCUMENTS

JP          2001281966 A   * 10/2001

* cited by examiner

Primary Examiner—Kishor Mayekar
(74) Attorney, Agent, or Firm—Oliff & Berridge, PLC

(57) ABSTRACT

An image forming apparatus useable with colorant and media includes a colorant applicator at which colorant is provided, and a nanotube assembly that emits electron beams to selectively charge the colorant on the colorant applicator, such that one of the charged and uncharged colorant is electrically attractable to the media.

40 Claims, 3 Drawing Sheets

IMAGE FORMING APPARATUS UTILIZING NANOTUBES AND METHOD OF FORMING IMAGES UTILIZING NANOTUBES

BACKGROUND OF THE INVENTION

1. Field of Invention

This invention relates to an image processing apparatus that uses a nanotube array as a field emission device.

2. Description of Related Art

A great variety of printing processes have been developed in which a latent image is formed on a latent image carrier, such as a photosensitive drum. These processes include, for example, semiconductor or photoconductor-based devices, wherein a latent image is formed on a surface of a latent image carrier by focusing a visible light image on the surface to selectively discharge regions of the surface, and charge transfer processes wherein a latent image is formed by depositing a charge onto the surface of a latent image carrier. The latter includes electrostatic processes, wherein a pin array creates the electrostatic latent image by spark discharges; ionographic processes, wherein ions are projected from a corona chamber to form the charge pattern; and charge deposition processes involving electron beam writing, or the projection of electrons or ions from charge transfer cartridges or print heads composed of arrays of multiple electrodes crossing at discharge sites. Other processes include magnetic imaging processes. These known approaches to imaging are highly developed, and resolutions of 300 dots per inch or greater are readily obtained, with several of the processes offering resolution many times greater.

In general, the known copying or printing processes develop a visible image by applying a toner or developer to the latent image. Typically, this is performed by applying toner in a flowing powder or liquid form to the latent image, and causing the toner to adhere only to the oppositely charged image areas.

SUMMARY OF THE INVENTION

Variations of known designs for printing machines are well documented. However, there exists a need for new designs and concepts for printing machines that can meet the ever-increasing demand for lower cost and/or higher resolution printing. Recent and rapid advances in technology are opening the door for these new designs and concepts.

Carbon nanotubes are a recent technological development that has widespread applications, most of which have yet to be discovered. Carbon nanotubes act as electron field emitters under circumstances of certain electrical bias, and therefore are useful in many applications requiring electron field emission. Carbon nanotubes may be modified to exhibit many types of electrical conduction properties, such as, for example, "armchair", "zigzag" and "chiral". The unique conductive properties of carbon nanotubes can be utilized by arranging a number of carbon nanotubes on a substrate to form an electron field emitter array or matrix. Thus, a field emission device can be provided by using carbon nanotubes.

In accordance with the invention, nanotubes are used as a field emitter device in an image forming apparatus, such as a printer or copier. In particular, an image forming apparatus or method of forming images can utilize nanotubes or nanotube based charge imaging.

The various exemplary embodiments of the devices and methods according to this invention use the field emission properties of carbon nanotubes to allow monochromatic and color printing devices to achieve higher resolution text and image printing at potentially lower cost.

The various exemplary embodiments of the image forming apparatus according to this invention provides significant advantages over existing electro-photographic print methodologies, such as laser printing, ink jet printing or xerography. For example, the use of a nanotube array in a printing device eliminates the need for optical or photoconduction processes to produce the final image. Further, by using nanotube arrays, it becomes possible to print with extremely high resolutions. Specifically, if a colorant particle could be made to be as small as the diameter of a nanotube, and a single nanotube could be selectively turned on or off, then a printer could be made to have a colorant dot size on the order of only a few nanometers. Thus, a printer with a very high resolution of many thousands of dots per inch is possible. As research progresses, more precise control of individual nanotubes and groups of nanotubes will become possible, resulting in these high resolutions.

According to one embodiment, an image forming apparatus includes a colorant applicator at which colorant is provided. A nanotube assembly emits electrons in order to selectively charge or discharge the colorant, such that one or more of the colorant is attractable to the media by using an electric field for the purposes of forming an image on the media. Electron emission from the nanotube element is achieved as electron field emission.

According to one embodiment, an image forming apparatus includes a colorant that is integral to the media. A nanotube assembly emits electron fields to selectively charge or discharge the colorant. In this embodiment, the subsequently charged colorant at the target location is attracted away from the media by an electric field and the remaining colorant forms an image on the media.

The nanotube assembly includes an array of nanotube elements. Each nanotube element includes at least one nanotube and has a distal end directed towards the colorant applicator. It should be appreciated that each nanotube element can include a group of several nanotubes.

The colorant can comprise colorant particles, which can be any type of particle, such as, for example, solid particles, liquid droplets or gel particles. The colorant particles can be in one or more of several different shapes, with each colorant particle having a dimension that is equal to or greater than the diameter of at least one nanotube. The colorant particles can also be microencapsulated with a coating. The coating is preferably optically transparent and non-conductive.

In embodiments, the image forming apparatus includes a nanotube assembly actuator that selectively actuates at least one nanotube element in the nanotube array to emit a directed electron field emission from the distal end of the at least one nanotube element. The actuator that causes one or more nanotube elements to emit an electron field can be any known or later discovered actuator that triggers individual or groups of nanotubes in an array or matrix of nanotubes to emit electron fields, wherein a stream of electrons are directed from the source nanotube element toward a specific intended target location on the colorant applicator. One example of an actuator method is to stimulate the nanotube element to emit electrons from its distal end by attaching the opposite end of the nanotube element to a conductive plate, wherein the nanotube element is in the presence of an electric field referenced to the conductive plate. If the electric field is strong enough, electrons will be emitted from the distal end of the nanotube element. Once the electrons are emitted from the nanotube element, they will be moved along a path toward the target on the applicator according to a directional vector, wherein the path of the electrons are determined by the overall electric and magnetic field strength and orientation, and the electron's momentum.

In embodiments, the image forming apparatus includes a controller that controls the nanotube assembly actuator based on image data provided by an image data source.

In embodiments, the image forming apparatus includes an electric field attraction means that moves electrically charged colorant to the media from the applicator.

In embodiments, the image forming apparatus includes an electric field attraction means that removes unwanted charged colorant from the media.

In one embodiment, the colorant particles can be initially in an electrically positive state. The electron field emitted from the at least one nanotube element electrically discharges the correspondingly targeted at least one positively charged colorant particle, such that the at least one electrically discharged colorant particle forms a negative image on the colorant applicator. In this embodiment, a negative polarity electric field is used to attract the electrically positive charged colorant particles other than the at least one electrically discharged colorant particle onto the media to form a positive image.

In other embodiments, the colorant particles can be initially in an electrically neutral state. The electron field emitted from the at least one nanotube element electrically charges the correspondingly targeted at least one colorant particle, such that the at least one colorant particle becomes electrically negative and therefore forms a positive image on the colorant applicator. In this embodiment, a positive polarity electric field is used to attract the at least one electrically negative charged colorant particle to the media to form a positive image.

In embodiments, the colorant applicator can have any known or later discovered shape or design. For example, the colorant applicator can be drum-shaped, or belt shaped.

In embodiments, the image forming apparatus includes a colorant reservoir that stores and supplies colorant to the colorant applicator. The colorant reservoir can be any known or later discovered reservoir, either separate from or integral to the colorant applicator.

In embodiments, the image forming apparatus can include a post-processing apparatus that electrically discharges the colorant on the media and fuses the colorant to the media. The post-processing apparatus can include a pair of rollers that apply heat and pressure to the media.

Other embodiments provide a method of forming an image on media using a colorant. The method includes providing colorant at a colorant applicator. Electrons in an electron field are emitted from a nanotube assembly comprising specific nanotube elements to selectively charge the colorant at the colorant applicator, such that one of the charged or uncharged colorant is attracted to the media using an electric field.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF PREFERRED EMBODIMENTS

Figure 1:
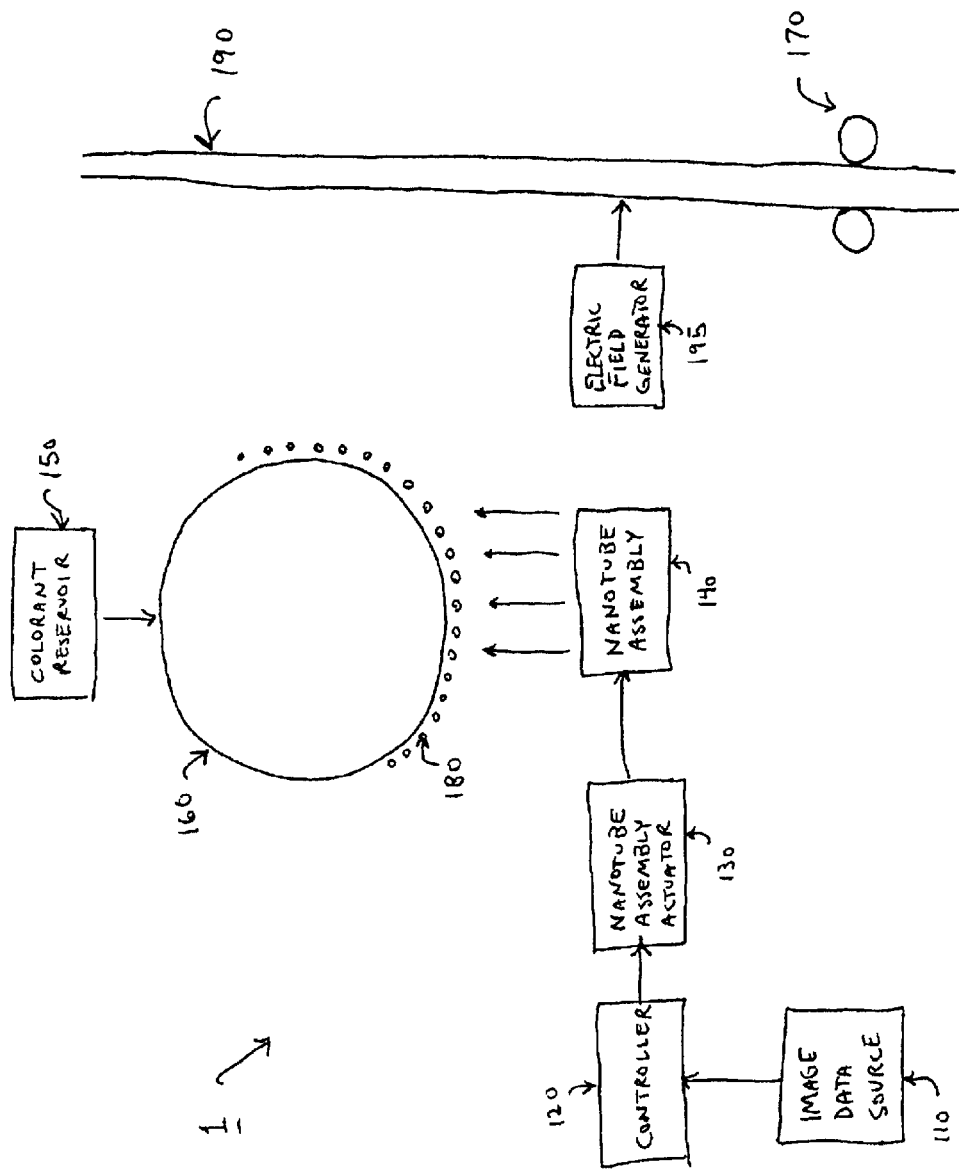
FIG. 1 shows one exemplary embodiment of the image formation apparatus according to this invention.

FIG. 1 shows one exemplary embodiment of the image formation apparatus according to this invention. The image formation apparatus 1 includes an image data source 110, controller 120, a nanotube assembly actuator 130, a nanotube assembly 140, a colorant reservoir 150, and a colorant applicator 160. As explained in detail below, the controller 120 controls the nanotube assembly 140 to emit beams of electrons at specific locations on the colorant applicator 160 covered with colorant particles 180, thereby charging one or more of the colorant particles 180.

Figure 2:
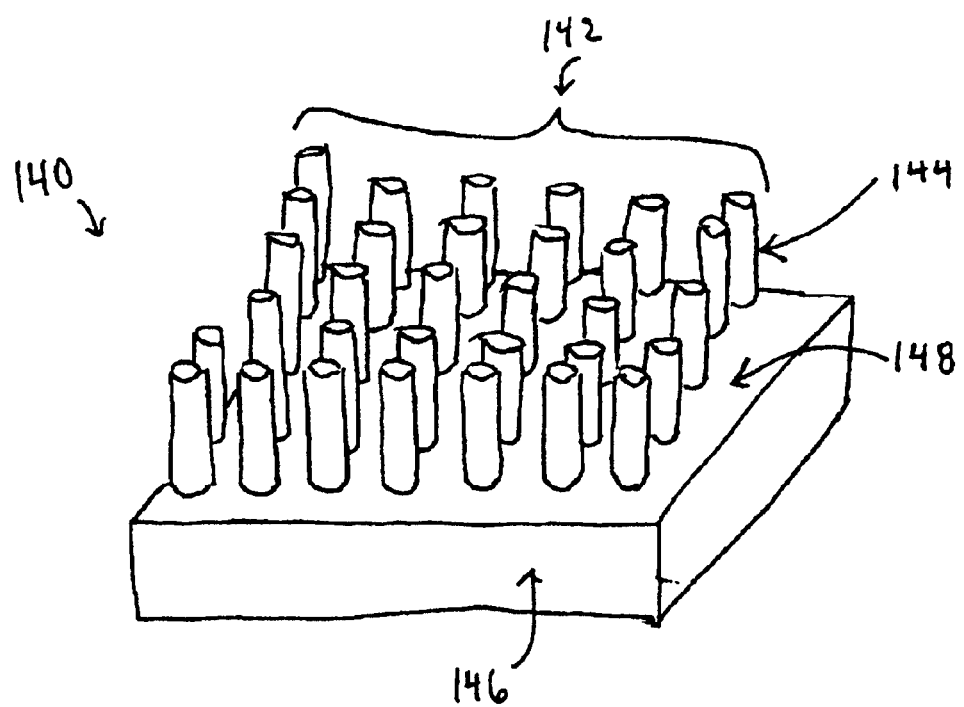
FIG. 2 shows a nanotube assembly usable with the various exemplary embodiments of the image formation apparatus according to this invention.

FIG. 2 shows the nanotube assembly 140. The nanotube assembly 140 includes an array 142 of segregated groups 144 of nanotubes arranged on a substrate 146. The long axis of each segregated group 144 of nanotubes is arranged perpendicular to the upper surface 148 of the substrate 146. It should be appreciated that the nanotube assembly shown in FIG. 2 is not meant to be limiting, and any variation of nanotube array or matrix can be used with the various exemplary embodiments of the methods and apparatus according to this invention. For example, although each segregated group 144 of nanotubes includes several nanotubes, it should be appreciated that single nanotubes can make up the array 142 rather than the segregated groups 144. Further, the array 142 of nanotubes can be of various length, width and height and can be of any number of carbon nanotubes desired. Also, the carbon nanotubes can be any distance apart, from closely spaced nanotubes wherein adjacent tube walls are touching to widely spaced nanotubes wherein adjacent nanotubes are several diameters apart. In addition, the nanotube array 142 may contain one type or many types of nanotubes, such as, for example, single walled or multi-walled nanotubes. Further, the nanotubes may have any type of conductive property possible, such as, for example, "armchair", "zigzag" or "chiral".

The image data source 110 provides image data to the controller 120. In general, the image data source 110 can be any one of a number of different sources, such as a scanner, a digital copier, a facsimile device that is suitable for generating electronic image data, a personal computer or a device suitable for storing and/or transmitting electronic image data, such as a client server of a network, or the Internet, and especially the World Wide Web.

The controller 120 controls the nanotube assembly actuator 130 based on the image data received from the image data source 110. The nanotube assembly actuator 130, in turn, activates selected segregated groups 144 of carbon nanotubes so that the selected groups 144 emit an electron field from their free ends. In various exemplary embodiments, the electron field emission can be controlled according to a two-dimensional coordinate system (or matrix address scheme) by controlling which carbon nanotube or group of nanotubes emit for a given write cycle. For each write cycle, electron beams from various and specific locations in the nanotube array 142 fire, thereby charging one or more colorant particles 180 on the colorant applicator 160.

In order to reduce costs, the size of the nanotube array can be reduced by printing a conventional piece of letter paper with several sequential write cycles. However, the various exemplary embodiments of the methods and apparatus according to this invention are not limited to sequential write cycles, and if the nanotube array could be made large enough, an entire image could be printed in one cycle.

Field emission from carbon nanotubes may be achieved by any number of methods. One such method involves disposing an electrode behind the colorant and electrically biasing the electrode with respect to the carbon nanotube, such that an electric field vector is set up. The electric field vector moves emitted electrons from the carbon nanotube, toward the desired location on the colorant applicator so as to polarize the specific desired colorant.

The nanotube assembly actuator 130 can be any known or later discovered actuator that triggers individual or groups of nanotubes in an array or matrix of nanotubes to emit an electron field from the array/matrix of nanotubes. For example, the nanotube assembly actuator 130 can use optical excitation, electric or electromagnetic fields or direct electrical excitation to trigger individual or groups of nanotubes. In embodiments in which normally conductive nanotubes are used, interconnecting circuitry disposed between the nanotube ends and the substrate could be used to activate individual or groups of nanotubes. Such interconnecting circuitry could be formed by lithography before the nanotubes are grown or applied to the substrate. Prior to nanotube attachment or growth, nanotube conduction pads would need to be placed over the substrate. The nanotube conduction pads could be formed by a lithography process requiring metalization or vapor material deposition, or by non-lithography processes using self-assembling nanostructures or emerging methods of soft lithography fabrication. Interconnection between control pads could be implemented by carbon nanowires or etched nanostructures such as is common in silicon microelectronics lithography processes. Control signal switching between a digital computer interface and field emitters in the array could be implemented using conventional semiconductors, or nano-switches made from carbon nanotubes or molecular electronic switches such as are emerging in the field of nanotechnology and molecular engineering. In general, the particular type of nanotube assembly actuator used with the methods and apparatus according to this invention is chosen depending on the desired results, such as the required resolution, or on the type of nanotube being used.

Although the colorant applicator 160 is shown as a drum in FIG. 1, the colorant applicator 160 can be of any other known or later-discovered shape or design, such as a belt. The colorant applicator 160 is covered with colorant particles 180. The colorant reservoir 150 stores colorant used to replenish the colorant particles on the colorant applicator 160 between write cycles, or when needed. The colorant particles 180 can be any type of particles, such as liquid droplets, liquid gel particles or solid particles. In the case of solid particles, the particles 180 can have any size or shape. Preferably, the solid particles are a nearly spherical shape having the smallest size possible with practical diameters equal to or larger than the diameter of a carbon nanotube. The material chosen for the particles 180 must allow acceptance of charge within its atomic structure so that a charged particle can be discharged and an uncharged particle can be charged.

The electrons emitted from the nanotube assembly 140 charge or discharge individual or groups of colorant particles 180 so that there is a substantial charge difference between the individual or groups of particles 180 and the remainder of the colorant particles 180 that are not charged or discharged by the electrons emitted from the nanotube assembly 140. The charged or discharged colorant particles correspond to the positive or negative digital photographic image. After the negative or positive image is imparted to the colorant particles 180 on the applicator 160, an electric potential is used to attract the positive image to the print media 190. In embodiments, the electric field generator 195 imparts a positive or negative charge directly to the media 190. In other embodiments, the electric field generator 195 includes charged electric plates (not shown) that produce an electric field vector that pulls the colorant particles onto the media 190.

In various exemplary embodiments, the colorant initially has some positive electrical charge, and then exposure to the negatively charged electron field from the nanotube assembly 140 will selectively decrease the specific colorant particle(s) positive electrical charge to form a negative image. A negative polarity electric field between the media 190 and the colorant particles 180 is subsequently applied by known methods to attract the remaining positively charged colorant particles to the media 190 to form the positive image on the media 190. In the preferred embodiment, the media 190 is not located between the nanotube assembly 140 and the colorant applicator 160 when the nanotube assembly 140 emits electron fields in order to transfer an image to the applicator. In the preferred embodiment, an image is first transferred to the applicator by means of nanotube electron field emission as previously described, then the image is transferred to the media as a secondary step by using an appropriately polarized electric field between the electrically charged colorant particles and the media so as to attract the desired colorant to the media to form the final image on the media. However, the invention is not limited to this preferred embodiment, and the media may be partially or fully located between the nanotube emitter assembly and the colorant applicator provided the electron field emission is strong enough to penetrate the media and adequately charge the colorant on the opposite side.

Although it is preferable that the colorant particles 180 are initially charged as electrical positive, it should be appreciated that the colorant particles 180 can have any initial charge state. For example, in other embodiments, the colorant particles 180 are initially uncharged (in a neutral, or near neutral, charge state) so that during electron field emission from the nanotube assembly 140 the colorant takes on a negative polarity. The negatively charged colorant makes up the positive or final image to be transferred to the media. A positive polarity electric field between the media 190 and the colorant particles 180 is applied by known methods to attract the negatively charged colorant particles to the media 190 to form the positive image on the media 190.

The energy level of field emission from the nanotube array and the exposure time will determined the extent of change in colorant charge state. For example, as the electron beam is left energized, it contributes more negative charge carriers to the colorant particle(s) at the target site and the colorant will decrease its positive charge. After some time of continued exposure, the charge state of the particular colorant particle(s) will neutralize, then begin to become more negative. Thus, the image formation apparatus according to this invention can be designed to precisely charge or discharge the target colorant particles to the degree desired for optimal results.

The number and arrangement of components in FIG. 1 is not meant to be limiting, and it should be appreciated that other configurations of the image processing apparatus according to this invention are possible. For example, the image formation apparatus 1 can also include a post-processing apparatus 170 which uses heat and pressure to fuse the colorant 180 into the media 190. Although the post-processing apparatus 190 is shown as a pair of rollers in FIG. 1, any known or later discovered post-processing device is appropriate.

After the electron beam emission from the nanotube array charges specific toner particles, the charge state of the specific colorant particles may be degraded by charge leakage from adjacent uncharged particles. This leakage might contaminate the charge state of the charged colorant particles before the electric field can move the particles forming the image to the media, resulting in the printing of false image dots.

In various exemplary embodiments, the above problem can be overcome by microencapsulating the colorant particles according to existing methods. Individual colorant particles or small groups of particles can be thinly coated so as to encapsulate the particle(s). Preferably, the encapsulation material is designed to be optically transparent to allow light to penetrate and reflect the proper characteristics of reflected light and color from the particle. The coating should also be electrically non-conductive at normal energy levels so as to prevent normal transfer of electronic charge between adjacent particles. Thus, the encapsulating material preferably acts as an insulator or charge migration barrier between particles. Because the electron beam emission from the carbon nanotubes represent a higher energy state than normal, electrons within the beam penetrates the encapsulation barrier easily so as to charge or discharge the particle or particles inside the encapsulation.

Methods other than total colorant encapsulation are possible provided the outer surface of the colorant is non-conductive and can provide a charge migration barrier with adjacent colorant.

Alternate methods of preventing charge migration among adjacent colorant include, but are not limited to, making the applicator surface from an electrically non-conductive and porous material, wherein individual or groups of individual colorant particles reside inside the pores, so as to prevent physical contact among colorant in adjacent pores.

Figure 3:
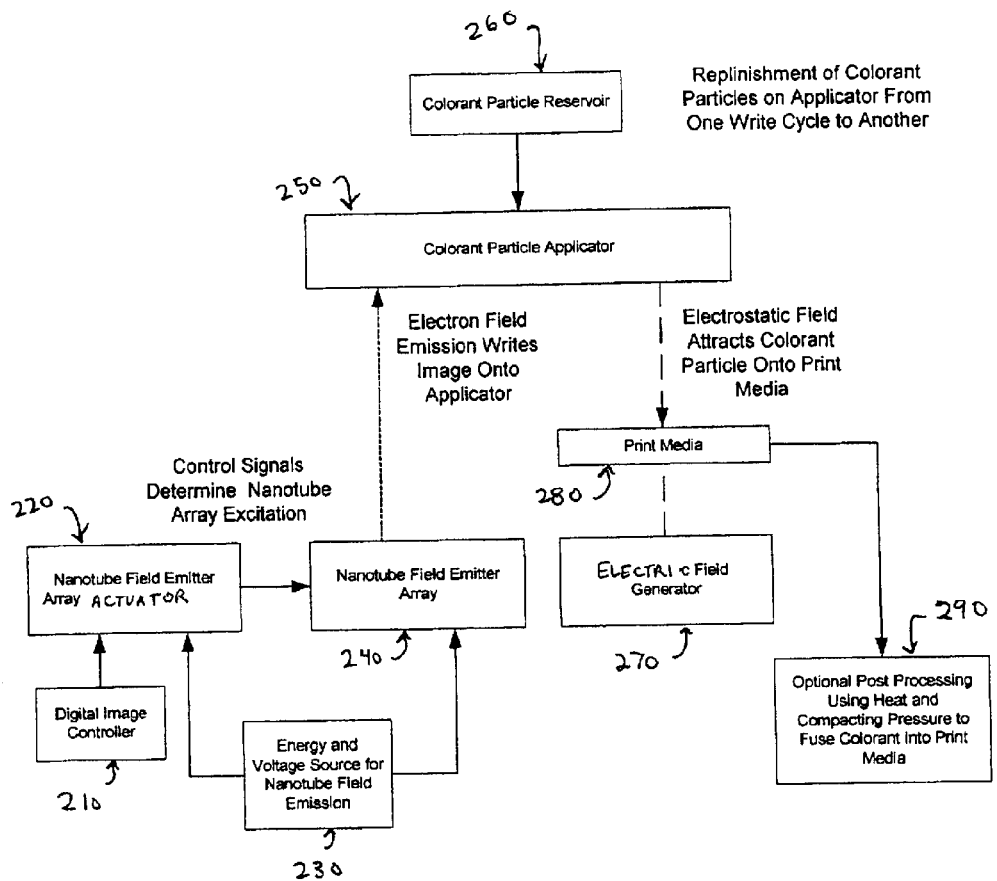
FIG. 3 is a block diagram showing the functional relationship between the various components of an exemplary embodiment of the image processing apparatus according to this invention.

FIG. 3 is a block diagram showing the functional relationship between the various components of an exemplary embodiment of an image processing apparatus according to this invention. In the image processing apparatus 200, a digital image controller 210 controls a nanotube field emitter array actuator 220 based on image data supplied from an image data source (not shown). As described previously, the image data source can be a personal computer, a scanner, a digital camera, a facsimile machine, a digital copier or any other known or later developed integrated or non-integrated device for generating monochrome or color image data. The nanotube field emitter array actuator 220 can be any known or later discovered actuator that actuates individual or groups of nanotubes in an array or matrix of nanotubes to emit electrons from the array/matrix of nanotubes. Depending on the type of nanotube field emitter array actuator 220 chosen, an energy/voltage source 230 may or may not be necessary to selectively activate groups of or individual nanotubes in the nanotube field emitter array 240.

The electrons emitted from the nanotube field emitter array 240 selectively charges at least one of the colorant particles on the colorant applicator 250. The colorant particles may be initially charged or initially uncharged.

For example, in embodiments, the particles may be initially positively charged. The electrons from the nanotube field emitter array 240 decrease the positive charge of at least one particle. The discharged at least one particle corresponds to the negative image.

In other embodiments, the particles may be initially uncharged. The electron field emission from the nanotubes causes the at least one particle to take on a negative charge. The negatively charged at least one particle corresponds to the positive or final image.

As discussed previously, the colorant particles are preferably solid particles having a nearly spherical shape, with individual particle diameters equal to or larger than the diameter of a carbon nanotube. In embodiments, the colorant particles may also be microencapsulated to prevent charge migration between the individual particles.

Further, the image processing apparatus may include a colorant particles reservoir 260. The colorant particles reservoir 260 replenishes the colorant particles on the colorant applicator 250 from one write cycle to another. The colorant particles reservoir 260 can be any known or later discovered reservoir that stores and supplies colorant to a colorant applicator.

After the at least one colorant particle is charged or discharged by the electrons emitted by the nanotube field emitter array 240, an electric field generator 270 applies an electric field between the media 280 and the colorant particles on the colorant applicator 250. The electric field causes the positive image on the colorant applicator 250 to be attracted to the media 280. The electric field generator 270 can be any known or later discovered electric field generator having, for example, a first charged plate located under the paper and a second charged plate located behind the colorant on the surface of the applicator, thereby causing the colorant particles to experience an electric field with a force vector pulling the colorant off the applicator and onto the paper. In the case where the colorant particles are initially positively charged, the electric field generator 270 generates a negative polarity electric field between the media 280 and the colorant particles to attract the positively charged particles to the media 280, thereby forming the final image on the media 280. In the case where the colorant particles are initially uncharged, the electric field generator 270 generates a positive polarity electric field between the media 280 and the colorant particles to attract the negatively charged particles to the media 280, thereby forming the final image on the media 280.

A post processing device 290 can be used to fuse the final image into the print media 280. The post processing device 290 can be any known or later discovered device that uses heat and/or pressure to fuse an image into media. The post processing device 290 can also electrically discharge or neutralize the particles making up the final image.

While this invention has been described in conjunction with the specific exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. An image forming apparatus for use with colorant and media, comprising:

a colorant applicator at which colorant is provided; and a nanotube assembly configured to emit electrons to selectively charge the colorant at the colorant applicator, such that one of charged and uncharged colorant is electrically attractable to the media.

2. The image forming apparatus of claim 1, wherein the nanotube assembly comprises:
an array of nanotube elements, the nanotube elements including at least one nanotube and having a distal end directed towards the colorant applicator.

3. The image forming apparatus of claim 2, further comprising a nanotube assembly actuator configured to selectively actuate the at least one nanotube element in the nanotube array to emit an electron field from the distal end of the at least one nanotube element.

4. The image forming apparatus of claim 3, further comprising an image data source that provides image data; and
a controller that controls the nanotube assembly actuator based on the image data provided by the image data source.

5. The image forming apparatus of claim 1, wherein the colorant comprises colorant particles.

6. The image forming apparatus of claim 5, wherein the colorant particles are at least one of solid colorant particles, liquid droplets and gel particles.

7. The image forming apparatus of claim 5, wherein the colorant particles are substantially spherically shaped, each colorant particle having a diameter that is equal to or larger than the diameter of at least one nanotube of the nanotube assembly.

8. The image forming apparatus of claim 5, wherein the colorant particles are coated or encapsulated to prevent charge migration to adjacent particles.

9. The image forming apparatus of claim 8, wherein the coating is optically transparent.

10. The image forming apparatus of claim 8, wherein the coating is non-conductive.

11. The image forming apparatus of claim 5, further comprising an electric field generator configured to establish an electric field wherein the selectively charged colorant particles are attracted away from the colorant applicator and onto the media.

12. The image forming apparatus of claim 11, wherein the electric field generator imparts a charge to the media such that the media attracts the selectively charged colorant particles.

13. The image forming apparatus of claim 11, wherein the electric field generator comprises:
a first charged plate disposed under the media; and
a second charged plate located behind the colorant particles at the colorant applicator, wherein
the first charged plate and the second charged plate generate an electric field with a force vector configured to pull the selectively charged colorant particles off the colorant applicator and onto the media.

14. The image forming apparatus of claim 11, wherein the colorant particles are initially in an electrically positive state, and an electron field emitted from at least one nanotube element of the nanotube assembly discharges at least one colorant particle, such that the at least one colorant particle forms a negative image on the colorant applicator.

15. The image forming apparatus of claim 14, wherein the electric field generator generates a negative polarity electric field such that the at least one colorant particle experiences an electric field force which attracts the at least one colorant particle away from the applicator and onto the media to form a positive image on the media.

16. The image forming apparatus of claim 11, wherein the colorant particles are initially in an electrical neutral state, and an electron field emitted from at least one nanotube element of the nanotube assembly charges at least one colorant particle, such that the at least one charged colorant particle forms a positive image on the colorant applicator.

17. The image forming apparatus of claim 16, wherein the electric field generator generates a positive polarity electric field such that the at least one colorant particle experiences an electric field force which attracts the at least one colorant particle away from the applicator and onto the media to form a positive image on the media.

18. The image forming apparatus of claim 1, wherein the colorant applicator has one of a drum shape, a circular shape, or a belt shape.

19. The image forming apparatus of claim 1, further comprising a colorant reservoir configured to store and supplies colorant to the colorant applicator.

20. The image forming of claim 1, further comprising a post-processing apparatus configured to electrically discharge the colorant on the media and fuses the colorant on media.

21. The image forming apparatus of claim 1, wherein the nanotube assembly comprises an array of carbon nanotube elements.

22. A method of forming an image on media using colorant, comprising:
providing colorant at a colorant applicator; and
emitting electron fields from a nanotube assembly to selectively charge the colorant at the colorant applicator, such that one of charged and uncharged colorant is electrostatically attractable to the media.

23. The method of forming an image of claim 22, wherein the nanotube assembly comprises:
an array of nanotube elements, the nanotube elements including at least one nanotube and having a distal end directed towards the colorant applicator.

24. The method of forming an image of claim 23, further comprising selectively actuating at least one nanotube element in the nanotube array to emit an electron field from the distal end of the at least one nanotube element.

25. The method of forming an image of claim 24, further comprising controlling the selective actuation of the at least one nanotube element based on image data provided by an image data source.

26. The method of forming an image of claim 22, wherein the colorant comprises colorant particles.

27. The method of forming an image of claim 26, wherein the colorant particles are one of solid colorant particles, liquid droplets and gel particles.

28. The method of forming an image of claim 26, wherein the colorant particles are near spherical in shape, each colorant particle having a diameter that is equal to or larger than the diameter of at least one nanotube of the nanotube assembly.

29. The method of forming an image of claim 26, further comprising microencapsulating the colorant particles with a coating.

30. The method of forming an image of claim 29, wherein the coating is optically transparent.

31. The method of forming an image of claim 29, wherein the coating is non-conductive.

32. The method of forming an image of claim 22, further comprising generating an electric field with an electric field force vector such that desired colorant particles will be attracted away from the applicator and onto the media to form a positive image.

33. The method of forming an image of claim 32, further comprising initially charging the colorant particles to an electrically positive state, such that an electron field emitted from at least one nanotube element of the nanotube assembly discharges at least one colorant particle at the colorant applicator to form a negative image at the colorant applicator.

34. The method of forming an image of claim 33, wherein the step of generating an electric field comprises generating a negative polarity electric field, such that the colorant particles other than the at least one colorant particle are attracted to the media to form a positive image on the media.

35. The method for forming an image of claim 32, further comprising initially discharging the colorant particles to an electrically neutral state, such that an electron field emitted from at least one nanotube element of the nanotube assembly charges at least one colorant particle to form a positive image on the colorant applicator.

36. The method of forming an image of claim 35, wherein the step of generating an electric field comprises generating a positive polarity electric field, such that the at least one colorant particle is attracted to the media to form a positive image on the media.

37. The method of forming an image of claim 22, wherein the colorant applicator has one of a drum shape, a circular shape, or a belt shape.

38. The method of forming an image of claim 22, further comprising a colorant reservoir that stores and supplies colorant to the colorant applicator.

39. A The method of forming an image of claim 22, further comprising a post-processing apparatus that electrically discharges the colorant on the media and fuses the colorant on media.

40. The method of forming an image of claim 22, wherein emitting electron fields from the nanotube assembly comprises emitting electron fields from a carbon nanotube assembly.

* * * * *